(12) United States Patent
Kaaresoja et al.

(10) Patent No.: US 6,693,900 B1
(45) Date of Patent: Feb. 17, 2004

(54) VARIABLE BIT RATE TRANSMISSION OF AV SIGNAL IN PACKET NETWORK

(75) Inventors: Topi Kaaresoja, Helsinki (FI); Martin Bergenwall, Espoo (FI)

(73) Assignee: Nokia Corporation, Espoo (FI)

( * ) Notice: Subject to any disclaimer, the term of this patent is extended or adjusted under 35 U.S.C. 154(b) by 515 days.

(21) Appl. No.: 09/687,318

(22) Filed: Oct. 13, 2000

Related U.S. Application Data

(63) Continuation of application No. PCT/FI99/00433, filed on May 18, 1999.

(30) Foreign Application Priority Data

May 19, 1998 (FI) ................................................. 981112

(51) Int. Cl.[7] ............................. H04B 1/66; H04L 12/56
(52) U.S. Cl. ................. 370/356; 370/389; 370/395.64; 348/14.13; 375/240
(58) Field of Search ................................. 370/352, 356, 370/389, 395.1, 395.61, 395.64, 401, 468, 521; 348/14.01, 14.12, 14.13, 384.1, 423.1, 425.1, 469, 473; 375/240, 240.01, 240.02, 240.26; 704/500, 503; 725/105, 118, 143, 148

(56) References Cited

U.S. PATENT DOCUMENTS

| | | | |
|---|---|---|---|
| 5,406,560 A | 4/1995 | Kondo et al. | 370/94.1 |
| 5,455,841 A | 10/1995 | Hazu | 375/240 |
| 5,844,600 A * | 12/1998 | Kerr | 348/17 |
| 5,901,149 A * | 5/1999 | Itakura et al. | 370/468 |
| 5,923,655 A * | 7/1999 | Veschi et al. | 370/394 |
| 6,359,656 B1 * | 3/2002 | Huckins | 348/512 |
| 6,487,603 B1 * | 11/2002 | Schuster et al. | 709/231 |

FOREIGN PATENT DOCUMENTS

| | | |
|---|---|---|
| EP | 0756267 | 1/1997 |
| WO | WO 97/48211 | 12/1997 |

OTHER PUBLICATIONS

ITU–T Recommendation 1.150, "B–ISDN Asynchronous Transfer Mode Functional Characteristics", *International Telecommunication Union*, pp. 1–10, Nov. 1995.
ITU–T Recommendation 1.361, "B–ISDN Layer Specification", *International Telecommunication Union*, pp. 1–29, Nov. 1995.
International Search report for PCT/FI99/00433.

* cited by examiner

*Primary Examiner*—Alpus H. Hsu
(74) *Attorney, Agent, or Firm*—Squire, Sanders & Dempsey L.L.P.

(57) ABSTRACT

Sample packets (S1–Sn) are formed from an input signal (1), there being a sample period (P1–Pn) related to each sample packet. The sample packets are inserted into a packet network (4) and transmitted to a recipient. The information content of the input signal per time unit (BR) is monitored and the information content of each sample packet (S1–Sn) is kept substantially constant on the basis of this information by controlling the duration of the sample period (P1–Pn) of the sample packets. Information on the duration of the sample period (P1–Pn) is transmitted to the recipient in the packet network packet. The packets (4) are received in the receiver and sample packets (S1–Sn) are separated from them and supplied to a decoder (7). Information on the duration of the sample period (P1–Pn) is also separated and supplied to the decoder (7), which uses it as the playing time of the restored output signal (8).

10 Claims, 1 Drawing Sheet

VARIABLE BIT RATE TRANSMISSION OF AV SIGNAL IN PACKET NETWORK

This application is a continuation of International Application Ser. No. PCT/FI99/00433 filed May 18, 1999.

BACKGROUND OF THE INVENTION

The invention relates to transmission of speech, video information, etc. coded with a variable bit rate (VBR) in a packet radio network, such as an ATM network, which uses fixed-length packets.

Use of ATM technology is becoming common in wired packet networks. The asynchronous transfer mode ATM has been developed for use in a broadband ISDN network. In ATM data transfer information is transmitted in packets with a standard length of 53 bytes, called ATM cells. In each cell five bytes consist of the cell header and the rest 48 bytes are payload, i.e. real data. ATM cells have been specified in ITU-T recommendations I.361 and I.150. To put it simply, the user information to be transmitted is split into fixed-length bit strings and each bit string is inserted into the information field of the ATM cell. The number of bit strings per time unit represents the transmission capacity required by the user. A header, which will be described in greater detail below, is also added to the information field, the result being an ATM cell with a standard length of 53 bytes. The cell is an independent data transmission unit because it indirectly includes information on the receiver's address on the basis of which the receiver is found in the network. The ATM network comprises various pre-defined service criteria for which a large number of different parameters can be set. These criteria include response time, bit error rate and probability of packet loss.

The ATM is a connection-oriented packet network, which means that connections are established and terminated according to standardized practices. A connection between two parties through the ATM network is called an ATM virtual channel. The advantages of the ATM include the fact that different services can be offered flexibly. For example, all bandwidths are equally possible within the capacity range of the physical layer in the ATM network (from 1.5 to 622 Mbps with existing technology).

ATM technology can also be used for transmitting coded speech and/or video signals, etc. If necessary, such a speech and/or video signal will be referred to as an AV signal below, but transmission of a speech signal in the ATM network will be used as the practical example. A general problem related to this case is that efficient coding of speech (in respect of the bandwidth) produces a signal with a variable bit rate (VBR).

If samples are taken from a speech signal at a fixed resolution and rate, the information content of the resulting digital signal per time unit is constant. However, since it is always practical to pack, i.e. compress, a speech-like signal before transmission, the compressed signal has a variable bit rate.

FIG. 1 is a block diagram of an apparatus in which the invention can be applied. Sample packets S (e.g. speech frames) are formed from an input signal 1 in a coder 2 by subjecting the input signal to A/D conversion and compression. A sample period P with a fixed duration is related to each sample packet. An ATM adapter 3 inserts the sample packets S into the payload part PL of the ATM cells 4. The recipient's identifier is inserted into the header H of the ATM cell. ATM cells are transmitted to a receiver via an ATM network 5, and the ATM adapter 6 of the receiver separates sample packets from the payload parts of the packets 4 and supplies them to a decoder 7 for producing an output signal 8.

FIG. 2 illustrates conventional technology for transmitting VBR coded speech packets in the ATM network. Curve BR (Bit Rate) shows speech information content per time unit (e.g. kbit/s). Samples are taken from the input signal 1 and coded into speech or sample packets $S_1$, $S_2$, etc. The respective sample periods are $P_0$, $P_1$, etc. Each sample packet $S_i$ can naturally be transmitted only after the sample period $P_i$ in question has ended, at moment $T_{i+1}$. In FIG. 2 the width of each sample packet $S_i$ illustrates its information content. A/D and D/A converters in blocks 2 and 7 are not always necessary, because transcoding, i.e. conversion, between two different coding methods is also possible. It should also be noted that the curve BR is only used to facilitate understanding of the invention. The coder does not have such information available, at least not in advance, but it produces corresponding information when coding the input signal.

The problem related to the technology of FIG. 2 described above is that bandwidth utilization is poor. This can be seen particularly in sample periods $P_3$ to $P_5$ when there is a pause in speech and silence descriptors SID, which the receiver replaces with comfort noise, are typically transmitted in mobile communication systems. A solution to this problem is disclosed in published commonly assigned PCT application WO97/48211. According to the art disclosed in it, ATM cells are filled with speech frames until the ATM cell is substantially filled up. However, correspondence between the ATM cell and speech frame is lost because there are typically whole speech frames in the middle of the ATM cell, whereas at its beginning and end there are parts of speech frames. This may cause problems e.g. during handover because in downlink traffic the first part and the last part of the ATM cell should be transmitted via different base stations.

BRIEF DESCRIPTION OF THE INVENTION

An object of the invention is to provide a method and an apparatus implementing the method to eliminate the above-mentioned problems. The objects of the invention are achieved with a method and system which are characterized by what is disclosed in the independent claims. Preferred embodiments of the invention are described in the dependent claims.

The invention is based on the idea that the size (information content) of the sample packets should be kept substantially constant. This is achieved by changing a coding parameter, such as duration of the sample period P or the coding method used. The coding method can be changed simply by arranging the coder 2 to form different sample packets S, S' and S" from the same sample period, and by selecting the largest sample packet that fits in the payload part PL. When the information content per time unit BR is low, a longer sample period is used and/or better coding is produced, and vice versa. However, this seemingly simple principle causes some new problems to which solutions are disclosed in connection with the preferred embodiments of the invention.

An advantage of the method and system of the invention is that the bandwidth is utilized optimally while one-to-one correspondence can be maintained between the sample packet and the ATM cell. When one sample packet corresponds to one ATM cell, error correction due to cell loss is a relatively clear procedure because only one sample packet is lost.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 3:
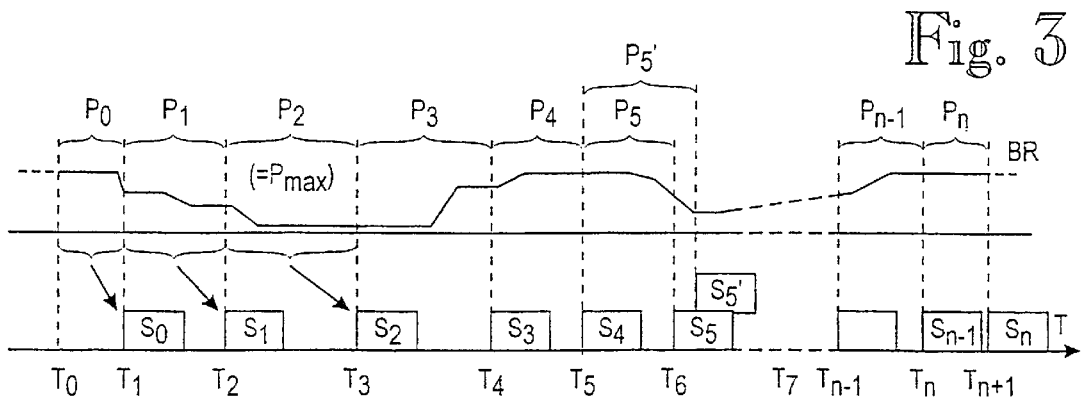
FIG. 3 illustrates VBR technology according to the invention.

FIG. 3 illustrates VBR technology according to the invention, where the size (information content) of sample packets $S_0$–$S_n$ is to be kept substantially constant by changing the duration of a sample period $P_0$–$P_n$. The speech or video codec has to analyze the information content of speech in real time. On the basis of this analysis the codec has to decide when it has enough information for coding a sample packet.

A problem arises from the fact that it is not easy to conclude from an incoming audio/video signal what its real information content is, i.e. at which point the codec has an optimal amount of the audio/video signal available. If the amount of information to be coded is too small, the sample packet is smaller than the payload part of the ATM cell, and thus bandwidth utilization will be poor. If the amount of information to be coded is too large, the sample packet does not fit in the payload part of one ATM cell and therefore it needs to be recoded or its size reduced.

A coding technique which allows removal of the least significant bits is the MPEG-4 wideband codec defined by Motion Picture Expert Group and described in ISO/IEC recommendation CD 0.1 14496-3, subpart 3. In this coding technique the complexity of the decoder can be reduced to some extent by decreasing the order of parameter LPC (Linear Predictive Coding). This order is normally 20 but it can be dropped to 17 or 14 simply by omitting the last 3 or 6 parameters.

Another codec which is similar in this respect is described in ITU-T recommendation G.727:"5-, 4-, 3- and 2-bits sample embedded adaptive differential pulse code modulation (adpcm)", Some bits can be removed from the bit flow produced by this codec without disrupting the whole coding.

If the codec used does not allow removal of bits from a complete coding result, it is possible to code a few (e.g. 2 to 5) different packets in advance and choose the most suitable one from these after coding (i.e. the largest one that still fits in the packet to be sent). This can be implemented by changing the length of the sample period and/or the coding method used. An example of changing the sample period length is seen in FIG. 3 at sample period $P_5$. After period $P_4$ the coder activates two sample periods $P_5$ and $P_5'$ which are of unequal length and from which respective sample packets $S_5$ and $S_5'$ are formed. The coder uses the largest sample packet it has formed that still fits in a packet network packet.

Another problem arises when the coder has received part of the information included in the sample packet and there is a long pause in speech. If the coder waits for the amount of information corresponding to the sample packet to fill up, the duration of the sample packet increases too much. Such a situation is to be seen in FIG. 3 at sample periods $P_2$ and $P_3$. Sample packet $S_1$ has been transmitted at moment T2. Shortly after this there is a long pause in speech and the information content of a sample packet with a standard length would not be filled until at moment T4. It is preferable to set an upper limit $P_{max}$ for the duration of a sample period. Thus it is not necessary to be prepared for an unreasonably long maximum delay between the coder and the decoder. A suitable value for the upper limit is around 40 ms. The influence of this upper limit can be seen in that the sample packet $S_2$ is transmitted at moment $T_3 = T_2 + P_{max}$.

A third problem is caused by the fact that the receiver (decoder) has to know how long the duration of the sample period $P_i$ of each sample packet $S_i$ is. This problem is most suitably solved by reserving some of the bits of the sample packet for indicating the sample period duration, i.e. the signal playing time reconstructed by the decoder. It can be thought that e.g. 6 bits are reserved for this purpose, and one bit corresponds to a playing time of 1 ms. Thus the playing time can be expressed at one bit intervals in a range from 0 to 63 ms. Alternatively, as the playing time increases, a change of one bit may increase the change of the playing time. In that case the coder and decoder may have a common table or algorithm which indicates the correspondence between the bits and the playing time.

According to a preferred embodiment, the duration of a sample period $P_i$ is expressed using a Huffman-type code where short codes correspond to the most common numbers and vice versa. Using this technology only 2 bits are needed to indicate the duration of the sample period $P_i$ when the information content of the input signal per time unit is at its highest, i.e. the sample periods are as short as possible.

Figure 4:
FIG. 4 illustrates a preferred embodiment where the delay between a coder and a decoder is set to its maximum value immediately at the beginning of a connection.

FIG. 4 illustrates a preferred embodiment according to which the decoder waits for said maximum delay $P_{max}$ already before playing the first sample packet even though the duration of the first sample packet were shorter than the maximum delay. The time is the same in FIG. 4 as in FIG. 3 but FIG. 4 illustrates what happens on the decoder side. An advantage of this embodiment is that the delay between the coder and the decoder can never increase during the connection, because it is at its maximum value already at the beginning of the connection. Naturally the decoder does not know exactly when the coder has coded the sample packet, but it can subtract the duration $P_1$ of the first sample packet from the maximum delay $P_{max}$ and wait for a period corresponding to the difference.

Figure 1:
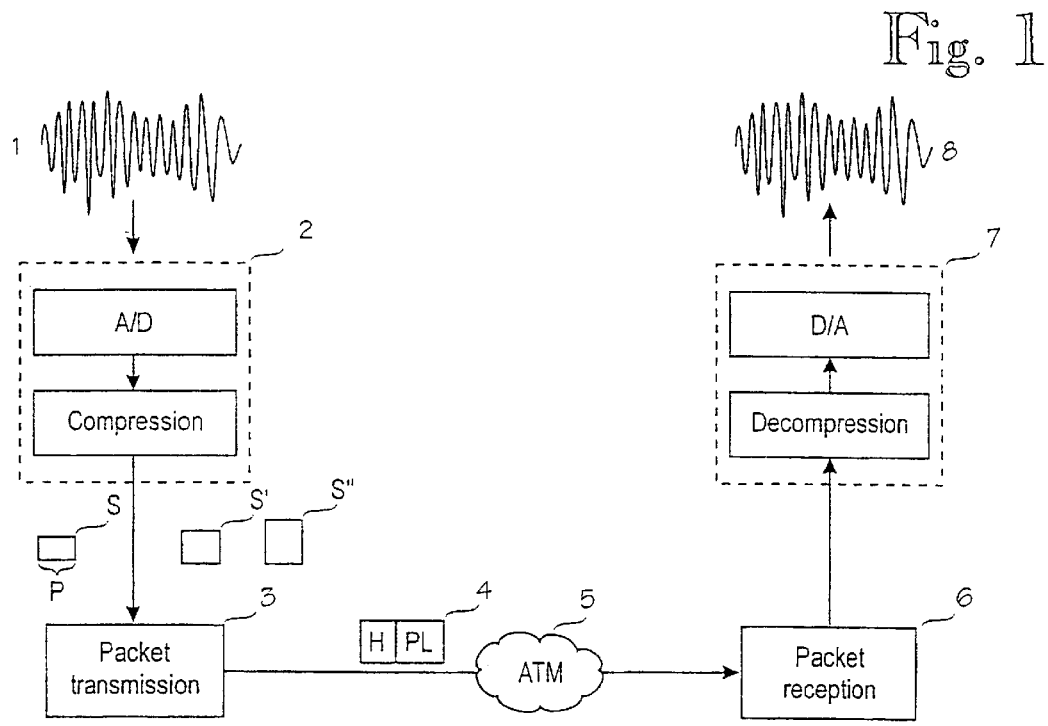
FIG. 1 illustrates an apparatus for transmitting sample packets as packets of the packet network, e.g. as cells of the ATM network.
Figure 2:
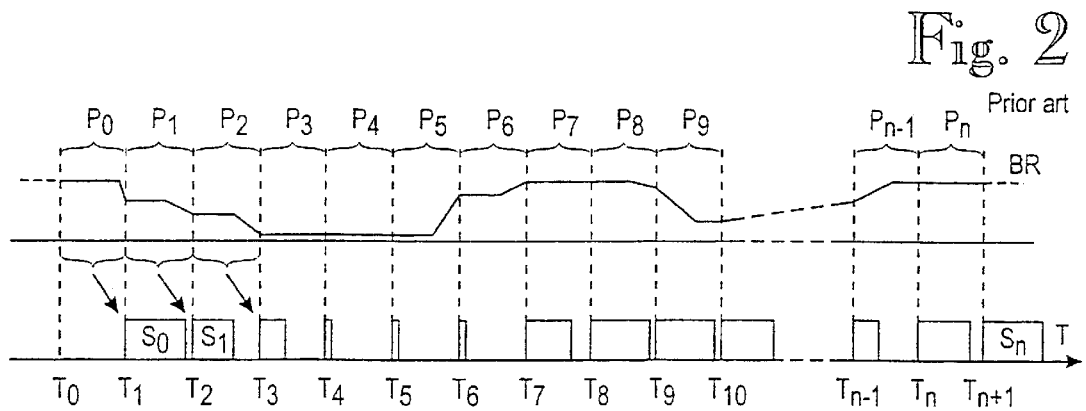
FIG. 2 illustrates conventional VBR technology.

In the case of a speech signal, in particular, adaptation of the human ear can be utilized. The quality of speech has to be as good as possible at the beginning of a connection but reasonable weakening of the speech quality can be tolerated better after the ear has adapted itself to the speaker's voice and the brains know what the context is. This can be implemented e.g. so that at the beginning of a speech connection the upper limit $P_{max}$ for the duration of the sample period is rather small, around 40 ms, but after a few seconds it can be increased to 60 or 80 ms, for example. With these exemplary values the improvement in bandwidth utilization due to the technology of the invention would at the beginning of the speech connection be 100 per cent compared to the prior art of FIG. 1, but after a few seconds 200 or 300 per cent.

It is obvious to a person skilled in the art that as the technology develops, the inventive concept can be implemented in various ways. The invention and its embodiments are not limited to the examples described above, but they may vary within the scope of the claims.

What is claimed is:

1. A method of transmitting an input signal representing at least one of audio information and visual information, wherein said input signal comprises an AV input signal, in a packet network, the method comprising:

forming sample packets from the AV input signal using at least one coding method, there being a sample period with a certain duration related to each sample packet;

inserting each sample packet into the payload part of a packet network packet and transmitting it to a recipient;

characterized by monitoring the information content of the AV input signal per time unit and attempting to keep the information content of each sample packet substantially constant on the basis of this information by controlling at least one of the duration of the sample period of the sample packets and the coding method used; and transmitting information on said at least one of the duration of each sample period and the coding method used to the receiver in the packet network packet.

2. A method according to claim 1, characterized by controlling the duration of the sample period of the sample packets.

3. A method according to claim 2, characterized in that the duration of the sample period has a first pre-determined upper limit which is increased after a pre-determined time, preferably after a few seconds from transmission of the first sample packet.

4. A method according to claim 1, characterized by:

forming sample packets in a manner which allows removal of the least significant bits from the sample packet formed so that the sample packet is still understandable; and removing the least significant bits from the sample packet if the information content of the sample packet is larger than the payload part of the packet network packet.

5. A method according to claim 2, characterized by:

forming at least two different sample packets with the sample periods of different duration at least at some sample packets when the sample packets are being formed; and inserting into the payload part of the packet the largest sample packet that fits in it.

6. A method according to claim 1, characterized in that the duration of the sample period is indicated using Huffman-type coding.

7. A method of restoring an output signal representing at least one of audio information and visual information, wherein said output signal comprises an AV output signal, from the information included in packet network packets, the method comprising:

receiving the packet network packets;

separating the sample packet from each packet network packet and supplying the sample packet to a decoder;

characterized by separating information on at least one of the duration of the sample period related to the respective sample packet and the coding method used from each packet network packet; and supplying this information to the decoder, which uses it for playing the sample packet of the restored AV output signal.

8. A method according to claim 7, characterized in that before restoring a sample, preferably the first sample, the decoder waits for a period which substantially corresponds to the difference between said upper limit and the duration of the sample in question.

9. An apparatus for transmitting an input signal representing at least one of audio information and visual information, wherein said input signal comprises an AV input signal, in a packet network, the apparatus comprising:

means for forming sample packets from the AV input signal there being a sample period with a certain duration related to each sample packet;

means for inserting each sample packet into the payload part of a packet network packet and transmitting the packet to a recipient;

characterized in that the apparatus is arranged to:

monitor the information content of the AV input signal per time unit and keep the information content of each sample packet substantially constant on the basis of this information by controlling at least one of the duration of the sample period of the sample packets and the coding method used; and transmit information on the at least one of the duration of each sample period and the coding method used to the recipient in the packet network packet.

10. An apparatus for restoring an output signal representing at least one of audio information and visual information wherein the output signal comprises an AV output signal from the information included in packet network packets, the apparatus comprising:

means for receiving the packet network packets and separating the sample packet from each packet network packet; and a decoder for producing the output signal from the sample packets;

characterized in that the apparatus is arranged to:

separate information on the at least one of the duration of the sample period related to the respective sample packet and the coding method used from each packet network packet; and supply this information to the decoder, which uses it for playing the sample of the restored AV output signal.

* * * * *